United States Patent [19]

Hartweck et al.

[11] Patent Number: 4,854,861
[45] Date of Patent: Aug. 8, 1989

[54] PROCESS FOR CALCINING LIMESTONE

[75] Inventors: Winfried G. Hartweck, Düsseldorf Wittlaer; Ulrich Hahn, Franzoseinsiepen, both of Fed. Rep. of Germany

[73] Assignee: Deutsche Filterbau GmbH, Düsseldorf, Fed. Rep. of Germany

[21] Appl. No.: 231,893

[22] Filed: Aug. 12, 1988

[30] Foreign Application Priority Data

Aug. 14, 1987 [DE] Fed. Rep. of Germany ....... 3727218

[51] Int. Cl.$^4$ .............................................. F27B 15/00
[52] U.S. Cl. ........................................ 432/14; 432/96; 432/99; 432/101
[58] Field of Search ........................... 432/14, 99–101, 432/95, 96

[56] References Cited

U.S. PATENT DOCUMENTS

| 3,957,422 | 5/1976 | Kohn | 432/99 |
| 4,002,422 | 1/1977 | Escott | 432/99 |
| 4,431,407 | 2/1984 | Beckenbach et al. | 432/99 |
| 4,452,584 | 6/1984 | Beckenbach et al. | 432/14 |
| 4,473,352 | 9/1984 | Sonoda et al. | 432/101 |
| 4,626,200 | 12/1986 | Cohen | 432/101 |
| 4,668,184 | 5/1987 | Dorman | 432/96 |

FOREIGN PATENT DOCUMENTS 2647021 4/1978 Fed. Rep. of Germany .

Primary Examiner—Henry C. Yuen
Attorney, Agent, or Firm—Barnes & Thornburg

[57] ABSTRACT

The present invention relates to a novel process and to an installation for performing the process for calcining limestone for producing lime of different qualities, whilst being able to entirely or at least substantially do without conventional energy carriers such as coal, oil and natural gas. Instead waste energy carriers of different origins are used. According to the process the waste energy substances are firstly gasified in a suitable gasifier, which is constructed as a shaft reactor or fluidized bed reactor and at elevated temperature, the dust being then removed from the lean gas produced and subsequently passed into the combustion chambers of the gasification reactor where burning takes place. The pollutants in the waste energy carriers are destroyed or rendered harmless by the high temperature of approximately 1600° C. in the gasification reactor. Dust and harmful components are then deposited in the coke filling or in the dust catchers. This is followed by further cleaning during burning in the gasification reactor at 1200° C. Finally, on flowing through the limestone bed residual pollutants are retained by chemical reaction and/or mechanical binding.

13 Claims, 2 Drawing Sheets

PROCESS FOR CALCINING LIMESTONE

BACKGROUND OF THE INVENTION

The present invention relates to a process for calcining limestone for producing quicklime or quicklime-like products by supplying heat into a kiln carrying the limestone, in which lean gas is produced from waste energy carriers, whereby said gas subsequently undergoes dust removal, accompanied by the extraction of the necessary calcining heat in the limestone-carrying kiln, where it is burned, the combustion waste gases being conveyed through the limestone bed. The invention also relates to an installation for performing the process for calcining limestone with a lime kiln, in which the limestone is passed into a hopper and brought into contact with calcining heat produced in burners arranged in distributed manner and which is followed by a dust catcher.

Limestone is calcined in large lime kilns, in that a temperature of approximately 1000° C. is produced in the kiln by conventional energy carriers such as coal, oil and natural gas. The energy carrier must be sought as a function of the quality of the lime to be produced, because otherwise the introduction of dust leads to a quality reduction. The general quality requirements made on the product quicklime, no matter whether it is hard or soft burned, do not allow an increased introduction of dust into the calcining part of the kiln, because this has a negative influence on the quality and colour of the product. Thus, despite the relatively high energy costs for this kiln process, it has hitherto been standard practise to stay with natural gas and oil, and less frequently coal. Waste energy carriers, such as fuel obtained from refuse, old tires, car shredding refuse, plastic waste and also used oil have a relatively high ash proportion compared with their calorific value. In the case of combustion in the conventional lime kiln, such ash would lead to the aforementioned significant reduction in the quality of the end product. Therefore, it has hitherto been considered impossible to use such waste energy carriers for calcining limestone.

DE-OS-26 47 021 discloses a process for operating a lime shaft kiln with a furnace or kiln chamber located outside the same, in which, under air deficiency, old tires are thermally decomposed, the decomposition products are introduced into the burning zone of the shaft kiln and after burned therein. The decomposition products are suppled from the furnace chamber of the shaft kiln or furnace via one or more ring mains into one or more planes. The old tires are introduced into the furnace chamber in comminuted form and are exposed to a temperature of over 1000° C. for a relatively short period. However, this known process is not suitable for gasifying waste materials having a lower calorific value than old tires, or comprising a heterogeneous mixture of different waste material types. Gasification takes place below the melting point of the solid gasification residues. Any harmful or polluting substances occurring during the gasification, such as dust containing dioxin or the like remain bound and must be eliminated in a complicated and costly manner.

The problem of the present invention is therefore to provide a process and an installation of the aforementioned type, in which it is possible to avoid during the gasification of the waste energy carriers dust containing polluting substances in unbound form.

SUMMARY OF THE INVENTION

According to the invention this problem is solved in that the solid and/or liquid waste energy carriers are gasified at a temperature over 1100° C. and that the slag components obtained which have not passed into the gas phase are granulated as a liquid phase in a water bath. Thus, any slag residues are in the liquid phase, which means that dust containing e.g. dioxin and similar harmful substances are bound in the liquid phase and granulated in a water bath. This not only leads to a simplification of the performance of the process, but simultaneously it is possible to make available an optimum quantity of liquid slag for the binding in of pollutants and in advantageous manner the composition thereof is very suitable for effectively binding said pollutants. An undesired washing out of the pollutants from the slag is no longer possible. Thus, the process according to the invention is particularly advantageous from the environmental standpoint. The process makes it possible to convert into harmless, bound forms otherwise highly problematical waste materials.

According to a preferred development of the inventive process, the gasification temperature is brought to and maintained at approximately 1600° C. by burning liquid or gaseous fuels in the form of waste energy carriers. As a result of this high temperature harmful compounds, such as e.g. dioxins or furans can be largely split up and consequently rendered harmless. It is advantageous that such high gasification temperatures can also be produced by a waste energy carrier, preferably a liquid waste energy carrier, so that there is no need to fall back onto rare and expensive energy carriers, or at the most this is necessary only for starting up such an installation. Advantageously the waste energy carrier can be constituted by used oil having a random origin.

In order to assist the calcining process, according to a further development of the invention the gas is burned at several points simultaneously which are distributed over the kiln wall, so that in the particular combustion chamber there is a uniform calcining of the limestone passed through.

The waste gases are appropriately passed through the limestone bed of the lime kiln, so that in this way a mechanical and/or chemical cleaning or purification is obtained. The waste gases give off part of their heat to the limestone bed, so that the latter is preheated. Following the flow through the limestone bed, the waste gases are lead out of the lime kiln, further heat being removed therefrom and used for preheating the combustion air for gasification. This leads to a very favourable heat balance and to an optimization of the process.

The invention makes it possible to process dust coming from other processes in an environmentally advantageous manner. For this purpose, according to the inventive process, dust containing dioxin and similar harmful substances are heated together with the waste energy carrier or separately within the scope of the gasification. On reaching the liquid phase, granulation takes place in a water bath. Thus, the dust containing the polluting substances are transformed in such a way that they can be subsequently reused as slag, or can at least be safely dumped, because it is no longer possible for any remaining pollutants to be washed out of the glass-like ash.

For improving the lean gas produced in the gasification of the waste energy carrier and simultaneously for dust removal purposes, prior to the actual dust removal the gas is preferably passed through a coke filter with uniform slag discharge. The term "uniform slag discharge" is here understood to mean that the coke slag produced during this process is advantageously mixed with the waste energy carrier slag and passed into a water bath and is then conveyed on. This not only leads to a simplification of the process, but simultaneously an optimum quantity of liquid slag is made available for the binding in of pollutants and as a result of the composition thereof it is effectively suitable for binding in the pollutants.

In order to carry out the gasification process in a planned and comprehensible manner, the flame produced during the substoichiometric combustion of the used oil is oriented in such a way that the combustion heat is directly supplied to the waste material or waste energy carrier to be gasified. Since in particular when burning used oil it is a correspondingly large flame and suitable burners must be used for this, it is possible to orient or align the flame in such a way that it can be effectively directed onto the entering waste energy carrier.

The process is performed by means of a lime kiln, which is followed by a dust catcher. The latter is used for covering lime dust, which can be processed together with the remaining burnt lime or separately therefrom. From the energy standpoint, with the lime kiln is associated a gasification reactor with a combustion nozzle directed onto the fuel intake, internally and/or externally arranged hot gas filters, as well as a slag bath with a lock or sluice outlet, the burners arranged in distributed manner being constructed as lean gas burners designed for hot gases. Such an installation makes it possible to produce and simultaneously process a lean gas for producing quicklime or for calcining limestone. In the gasification reactor a lean gas is produced which, as a result of its high temperature and due to the burning in the lime kiln, introduces a calcining heat of approximately 1100° C. A quality-reducing influencing of the lime is prevented in that said gas is previously effectively cleaned and is freed from pollutants by the high temperature in the gasification reactor.

In order to be able to regulate the temperature in the lime kiln, the collecting mains position upstream of the burners are constructed with a variable cross-section. It is also proposed that additional burners be associated, which are designed as oil or normal gas burners, so that on initiating the calcining process and also during the performance thereof a continuous and optimized control to the desired or necessary level is possible.

Appropriately the additional burners are distributed in the individual combustion chambers and/or in the lime kiln. Thus, the entire calcining heat introduced into the lime kiln can be kept at an advantageous uniform level, or it is possible to calcine the lime from the inside, in that namely burners are provided in the lime kiln.

According to another appropriate construction the lime kiln has a charging hopper issuing into the top combustion chamber and out of which leaves a waste gas pipe with which is associated a waste gas heat exchanger. This makes it possible to use the still very hot waste gas for preheating the combustion air required for the operation of the gasification reactor.

The invention also advantageously provides for the outer walls of the gasification reactor to have pipelines or heat exchangers, which are bound into a steam system with steam cylinder and condensing turbine. The steam produced is passed via the condensing turbine and the current produced as a result of this can be used for the power supply of the complete installation, which makes operation even less expensive. The individual combustion chambers are constructed in such a way that a pilot burner is associated with each chamber, said burner being operable with oil or gas and is preferably integrated into a burner. The pilot burner is dimensioned in such a way that it ensures a reliable ignition of the lean gas supplied and also makes it possible to ensure a fine setting of the lime burning temperature. The installation is controlled by means of the temperature measured in the combustion chamber. According to another construction the additional burners are constructed as pilot burners or are arranged so as to act as pilot burners.

Thus, a process and an installation are provided making it possible to effectively process the waste energy gas carriers hitherto considered unusable from the economic standpoint, in such a way that the energy thereof subsequently comes into effect in a calcining process. There is no prejudice to the environment, because it is simultaneously possible to effectively bind in or destroy the pollutants in the waste energy carriers, so that simultaneously an advantageous disposal method is provided for such waste materials.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
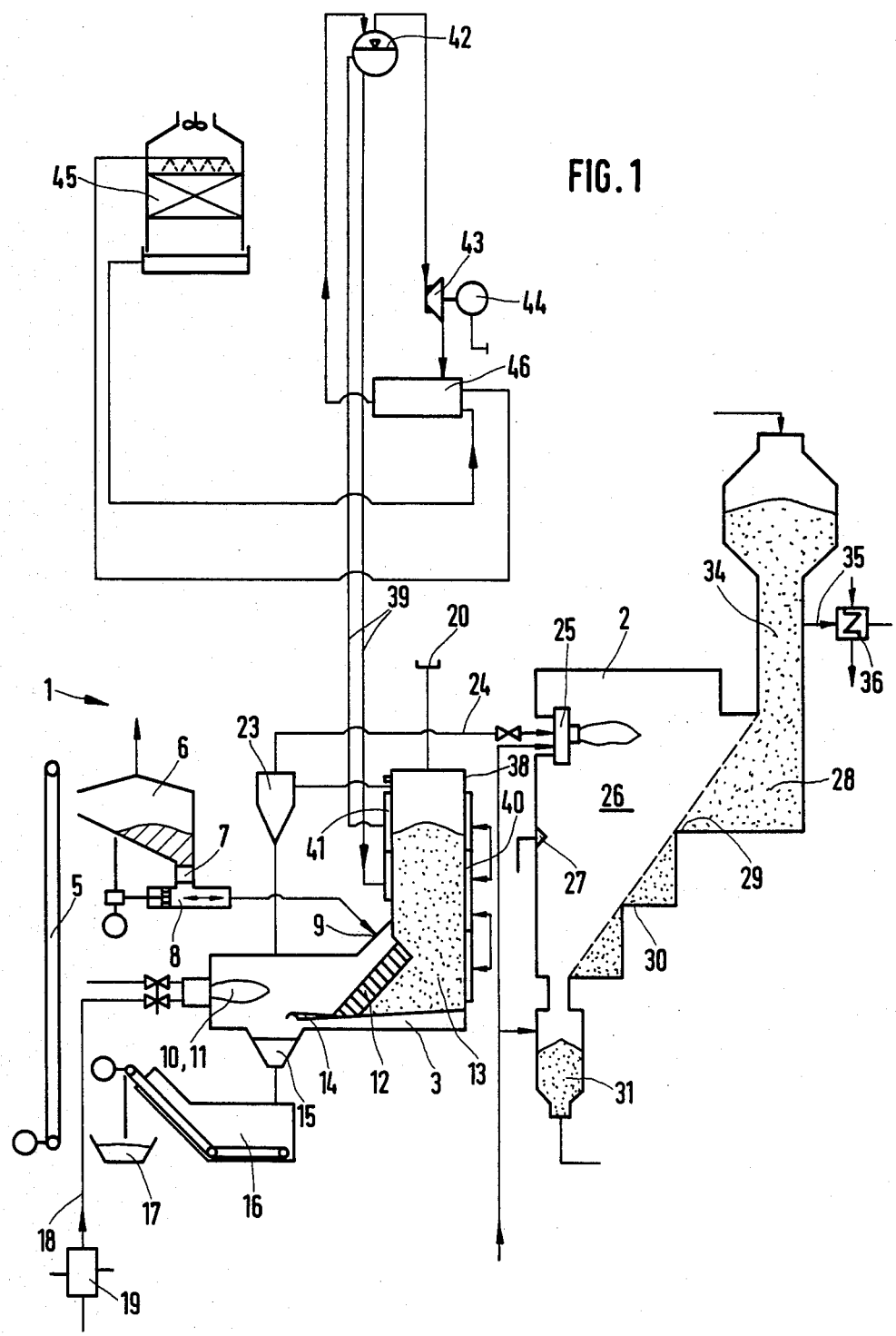
FIG. 1 a diagrammatic view of the calcining plant.

The calcining installation 1 shown in FIG. 1 comprises a lime kiln 2 and an upstream-connected gasification reactor 3. The heat required for calcining in the lime kiln 2 is produced through the burning of a lean gas, which is produced in the gasification reactor 3 from waste energy carriers of different origin. The waste energy materials are initially gasified at high temperature in the appropriate gasification reactor 3 and dust is removed subsequently from the thus produced gas before it is lead into the combustion chambers of the gasification reactor 3 of the downstream lime kiln 2. The waste energy carriers can be fuel produced from refuse, unpelleted refuse, i.e. so-called fluff, old tires, car shredding refuse or plastic waste, as well as used oil and the like. The waste energy carriers of different origins are preferably mixed before hand and then supplied by means of the fuel regulator 5 to a metering hopper 6. The latter has a cover, which is provided with a waste gas pipe used for removing any gas collecting in the vicinity of the cover. This gas is then also appropriately burned in the lime kiln 2.

The waste energy carriers pass from the metering hopper via a sluice or lock 7 into a feed conveyor 8, from where they are fed via the fuel intake 9 into the gasification reactor 3. They slide over a grate 12 and are gasified as a result of the heat from the combustion nozzle 10 and its oil flame 11. The combustion nozzle 10 with the oil flame 11 is preferably supplied by used oil, so that the complete gasification process is exclusively brought about by waste energy carriers.

The lean gas released durng the gasification process on the grate 12 subsequently flows through the coke filling 13 in the direction of the gas outlet, the gas being further enriched in the gas filling and simultaneously dust particles are removed therefrom. The slag from the coke filling 13 and the slag sliding down from the grate 12 initially passes into a slag label 14, from where it drips in the liquid state into the slag bath 15. This leads to a granulation of the slag, with the binding in of any pollutants present and subsequently after passing through the lock outlet 16 is conveyed away in containers 17. As a result of the high temperatures in the gasification reactor 3 it is always ensured that liquid slag is formed. The temperatures are 1400°-1600° C. and such high temperatures more particularly result from the burning of the additional energy carrier, i.e. the used oil. There is a simultaneous supply of the necessary combustion air via the combustion air pipe 18 and said air has previously passed through the preheating means 19. The coke for the coke filling 13 passes via the fuel lock 20 into the gasification reactor 3, the height of the coke filling 13 also being decisive for the gas quality.

Although the resulting gas has a low calorific value, the temperature is 800°-1300° C., preferably 1000° C. This lean gas firstly undergoes dust removal in a hot gas filter 23 without reducing the gas temperature and is then passed via the collecting main 24 into the combustion chamber of lime kiln 26, where the lean gas is burnt in the burners 25, which are associated with the combustion chamber 26 and possibly further combustion chambers.

Prior to the supply of the lean gas at high temperature to the individual kiln combustion chambers 26, it is subdivided into several collecting lines. The individual parts of the collecting lines are designed in such a way that the necessary energy quantity is supplied to each fuel plane of the kiln. The individual combustion chambers 26 are constructed in such a way that it is always possible to connect in several additional burners 27, so that it is possible to ensure the desired and necessary temperature in the lime kiln 2. Thus, the limestone bed 28, which extends over several zones 29,30, is exposed to uniform heat, so that a continuous calcining process takes place. To the bottom of the last zone 30 is connected the lime hopper 31 from which can be removed the finished quicklime or the other quicklime-like products.

Laterally a waste gas pipe 35 is provided which removes waste gas from the limestone packed flue 34 and into an integrated waste gas heat exchanger 36. The latter produces the necessary heat for the preheating means 19 and to it is connected a dust catcher (not shown), in which the lime dust is either recovered or is separated for a separate dumping.

The outer wall 38 of the gasification reactor 3 is equipped with an all-round pipeline 39 or with heat exchangers 40,41, so that cooling with steam of the gasification reactor 3 is possible. The steam system with the bound-in steam cylinder 42 makes it possible to produce a uniform steam enabling power to be produced in the condensing turbine 43 with generator 44 and said power covers the requirements of the complete calcining installation 1. The complete installation is therefore advantageously rendered independent of outside power supplies, apart from the waste energy carriers. The necessary water or steam are prepared in a cooling water tower 45 and the downstream boiler 46.

Figure 2:
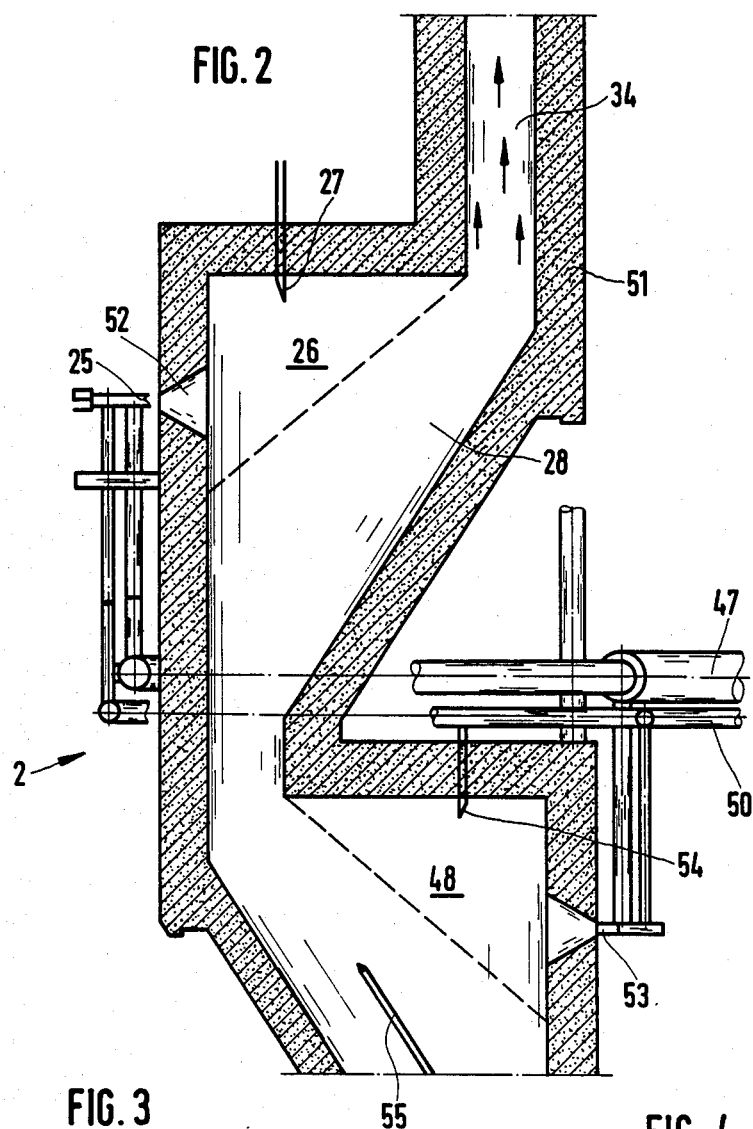
FIG. 2 a detail from the lime kiln.
Figure 3:
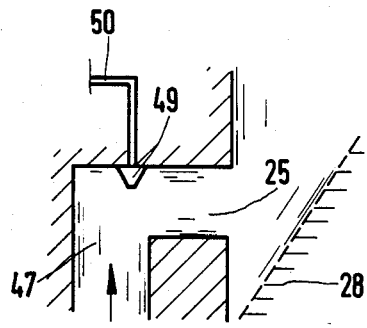
FIG. 3 a pilot burner integrated into a burner.
Figure 4:
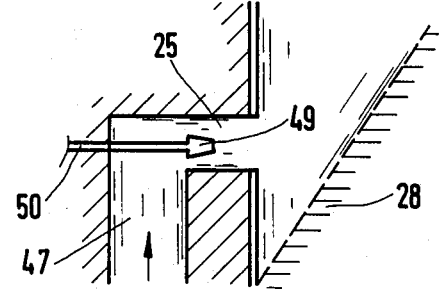
FIG. 4 another construction of the integrated pilot burner.

The individual burners 25 are supplied with the necessary lean gas by means of the gas line 47, as shown in FIG. 2. The normal gas required for starting or for control purposes is supplied by gas line 50. To the latter are e.g. also connected the pilot burners 49, associated with at least one of the burners 25 of each combustion chamber 26,48. The special arrangement of said pilot burner 49 is shown in FIGS. 3 and 4, whereby only two arrangement possibilities are shown. However, other solutions are also conceivable and in particular the burner opening 52 can be funnel-shaped, as shown in FIG. 2, or linear, as shown in FIGS. 3 and 4. The kiln brickwork is 51 and the burner associated with the lower combustion chamber 48 is 53. The additional burner associated with combustion chamber 48 is 54, whilst the additional burner 55 associated with the interior of the lime kiln 2 is located centrally in the limestone bed 28.

The following table summary shows an exemplified list of possible pollutant or heavy metal fractions, namely lead, chrome, sulphur and arsenic in the different components of the system in mg/kg or mg/m$_3$.

|  | Pb | Cr | AS | S |
| --- | --- | --- | --- | --- |
| BRAM* | 42 mg/kg | 17.5 | 0.5 | 508 |
| Used oil | 88 mg/kg | 0.5 | — | 176 |
| Product gas | 104 mg/m$^3$ | 5.4 | 0.15 | 616 |
| Filter waste gas | 2.6 mg/m$^3$ | 0.1 | 0.008 | 30.8 |
| TA-Air | 5 mg/m$^3$ | 5 | 1 | 500 |
| Slag | 26 mg/kg | 12.6 | 0.35 | 68 |
| Lime | 52 mg/kg | 4.4 | 0.07 | 308 |

*BRAM = fuel produced from refuse.

What is claimed is:

1. A process for using the heat of combustion of waste materials in the calcining of limestone in a kiln supplied with a lean gas produced in a waste material gasification reactor comprising the steps of:
   (a) introducing waste material and combustion air into a waste material gasification reactor, the amount and kind of waste material and combustion air introduced being such as to operate the gasification reactor at a temperature above about 1100° C. to produce a lean gas and waste slag;
   (b) cleaning the lean gas of dust to form a cleaned lean gas, and introducing the cleaned lean gas into a combustion chamber of a lime kiln where it is burned to form a combustion waste gas and quicklime-like products; and
   (c) removing the slag from gasification reactor and granulating the slag in a water bath to contain any polluting substances originally present in the waste material.

2. The process of claim 1 further comprising the step of introducing coke into the gasification reactor to filter the lean gas and to form a coke slag.

3. The process of claim 2 further comprising the step of mixing the coke slag and the waste slag prior to the removal of the slag from the gasification reactor.

4. The process of any one of claims 1 to 3 wherein the waste material and combustion air are introduced so as to operate the gasification reactor at a temperature of about 1600° C.

5. The process of any one of claims 1 to 3 wherein the waste material introduced into the gasification reactor includes used oil of random origin.

6. The process of any one of claims 1 to 3 wherein said cleaning step includes the steps of:
   introducing the lean gas into a hot gas cyclone separator to separate dust from the lean gas, and
   reintroducing the separated dust into the gasification reactor.

7. The process of any one of claims 1 to 3 wherein the lean gas introduced into the combustion chamber of the lime kiln has a caloric value of between about 500 and 900 Kcal/Nm$^3$.

8. The process of claim 7 wherein the lean gas introduced into the combustion chamber of the lime kiln has a temperature of about 900° C.

9. The process of any one of claims 1 to 3 wherein the lean gas exiting the gasification reactor has a temperature of between about 800° and 1300° C.

10. The process of any one of claims 1 to 3 further comprising the steps of:
    removing heat from said combustion waste gas, and
    using the removed heat to heat said combustion air prior to its introduction into the gasification reactor.

11. The process of any one of claims 1 to 3 wherein the lean gas introduced into the combustion chamber of the lime kiln has a temperature of at least about 300° C.

12. A process for using the heat of combustion of waste materials in the calcining of limestone in a kiln supplied with a lean gas produced in a waste material gasification reactor comprising the steps of:
    (a) introducing waste material and combustion air into a waste material gasification reactor, the amount and kind of waste material and combustion air introduced being such as to operate the gasification reactor to produce a flow of lean gas and waste slag;
    (b) introducing coke into the gasification reactor in a direction counter to the flow of the lean gas to filter the lean gas and to form a coke slag;
    (c) cleaning the lean gas of dust to form a cleaned lean gas and separate dust from the lean gas, and introducing the cleaned lean gas into a combustion chamber of a lime kiln where it is burned to form a combustion waste gas and quicklime-like products;
    (d) reintroducing the separated dust into the gasification reactor and binding it with the coke and waste slag; and
    (e) removing the slag and material bound thereto from the gasification reactor and granulating the slag in a water bath to contain any polluting substances originally present in the waste material.

13. The process of claim 12 further comprising the steps of:
    removing heat from said combustion waste gas, and
    using the removed heat to heat said combustion air prior to its introduction into the gasification reactor.

* * * * *